(12) United States Patent
Yoshida et al.

(10) Patent No.: US 7,238,411 B2
(45) Date of Patent: Jul. 3, 2007

(54) MULTILAYERED POLYESTER FILM AND PROCESS FOR PRODUCING THE SAME

(75) Inventors: Tetsuo Yoshida, Sagamihara (JP); Tetsuo Ichihashi, Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/505,048

(22) PCT Filed: Feb. 10, 2003

(86) PCT No.: PCT/JP03/01384

§ 371 (c)(1),
(2), (4) Date: Jan. 27, 2005

(87) PCT Pub. No.: WO03/070460

PCT Pub. Date: Aug. 28, 2003

(65) Prior Publication Data

US 2005/0123779 A1   Jun. 9, 2005

(30) Foreign Application Priority Data

Feb. 21, 2002   (JP) .............................. 2002-044517

(51) Int. Cl.
*B32B 7/02* (2006.01)
*B32B 27/08* (2006.01)
*B32B 27/36* (2006.01)
*B32B 37/15* (2006.01)
*B32B 38/00* (2006.01)

(52) U.S. Cl. ...................... 428/212; 428/213; 428/480; 428/910; 264/173.11; 264/173.12; 264/173.15; 264/280; 264/288.4; 264/290.2; 528/302; 528/307; 528/308; 528/308.6; 528/308.7

(58) Field of Classification Search ...................... None
See application file for complete search history.

(56) References Cited

U.S. PATENT DOCUMENTS 4,734,335 A    3/1988  Monzer 5,885,689 A    3/1999  Hasegawa et al.

FOREIGN PATENT DOCUMENTS

| JP | 59-62149 A | 4/1984 |
|---|---|---|
| JP | 5-104618 A | 4/1993 |
| JP | 7-60926 | 3/1995 |
| JP | 7-237283 A | 9/1995 |
| JP | 8-244189 A | 9/1996 |
| JP | 8-279150 | 10/1996 |
| JP | 2002-096438 | * 4/2002 |
| JP | 2002-096439 | * 4/2002 |

* cited by examiner

Primary Examiner—Vivian Chen
(74) Attorney, Agent, or Firm—Sughrue Mion, PLLC

(57) ABSTRACT

The present invention is a multilayer polyester film comprising a layer A and a layer B which are laminated alternately, the layer A constituting the outermost layer on both sides of the film, wherein (1) the layer A comprises a polyester A, and the layer B comprises a polyester B, (2) the melting point of the polyester A is higher than the melting point of the polyester B by at least 15° C., (3) the layer A is a layer having an oriented structure, and the layer B is a layer having a substantially unoriented structure, (4) the ratio (a/b) of the total thickness (a) of the layer A to the total thickness (b) of the layer B is 0.01 to 3, and (5) the in-plane tensile strength of the multilayer polyester film is 50 MPa or lower at a maximum, and the difference between its maximum value and minimum value is 20 MPa or smaller; and a method for producing the multilayer polyester film. According to the present invention, there is provided a film having excellent isotropy of in-plane tensile strength, excellent transparency, a low degree of thickness unevenness and excellent moldability.

20 Claims, No Drawings

MULTILAYERED POLYESTER FILM AND PROCESS FOR PRODUCING THE SAME

TECHNICAL FIELD

The present invention relates to a multilayer polyester film. More specifically, the present invention relates to a multilayer polyester film which is excellent in moldability, processability, solvent resistance, dimensional stability and transparency. Further, the present invention also relates to a film which is used in applications in which the film is subjected to deformation processing such as molding or embossing. Further, the present invention also relates to a film which is useful in applications in which the film is held and fixed by holding metallic parts and used.

BACKGROUND ART

In recent years, films (sheets are also included. The same definition will apply to the following description) are used in the field of food packages such as trays and ice cream cups. Further, films are also used in the field of drug packages such as PTP drug packages for capsules and tablets. Further, films are also used in the field of laminated molded articles used in furniture, indoor/outdoor ornaments, electrical appliances and automobile parts (for example, a laminated molded article comprising a film and paper, wood, metal or a resin). Further, films are also used in the field of materials for cards (e.g., IC cards and magnetic recording cards) such as ATM cards, ID cards and credit cards. Further, films are also used in the field of agriculture such as a green house. As described above, films are used in a wide variety of fields.

In general, these materials are often products having nonflat surfaces such as curved surfaces and uneven surfaces in addition to products having flat surfaces. Accordingly, a rigid polyvinyl chloride resin film having excellent processability and moldability is primarily used. However, since the polyvinyl chloride resin has poor heat resistance, a product using the resin may be deformed when exposed to high temperatures, e.g., left in an automobile in midsummer. Further, the polyvinyl chloride resin causes an environmental problem since it is liable to generate chlorine-based harmful substances when burned after used.

Further, an unoriented polyethylene terephthalate film called "A-PET" (trade name) is also used. However, although this has excellent moldability, it has a problem that when it is used over a long time period, an embrittlement phenomenon occurs, and it undergoes a loss of transparency and a decrease in elongation. To solve this problem, a method using an unoriented thermally crystallized polyethylene terephthalate film is proposed (Patent Publication 1). However, this film has a problem that it has poor embossing processability and moldability.

Further, a 1,4-cyclohexane dimethanol derivative copolymerized polyester is proposed as a substitute resin for a polyvinyl chloride. However, although a film of this resin shows improvements in moldability and a change with time, the polymer on the surface of the film is dissolved by a solvent in ink and the ink is liable to set off when printing is made on the film by use of ink or the like. That is, this film has poor organic solvent resistance. Further, a product made of the film is liable to be curled or deformed, indicating that the film has insufficient dimensional stability.

To solve these problems, the present inventor has previously proposed a multilayer polyester film comprising a polyester layer having an oriented structure and a polyester layer having a substantially unoriented structure (Patent Publications 2 and 3). However, it has been revealed that the moldability of the multilayer polyester film still needs to be improved.

That is, it has been revealed that when a molded article with an uneven structure is produced from the multilayer polyester film, it shows better moldability than the conventional unoriented thermally crystallized polyethylene terephthalate film, but the shape of the molded article is liable to be distorted. It is assumed that the distortion is caused by unevenness in thickness due to unsatisfactory in-plane isotropy of the film.

(Patent Publication 1)
Japanese Patent Laid-Open Publication No. 8-279150
(Patent Publication 2)
Japanese Patent Laid-Open Publication No. 2002-96438
(Patent Publication 3)
Japanese Patent Laid-Open Publication No. 2002-96439

PROBLEMS TO BE SOLVED BY THE INVENTION

An object of the present invention is to solve these problems and provide a film which is useful in fields of, for example, food packages, drug packages, laminate molding, IC card materials, magnetic recording card materials and agriculture. Another object of the present invention is to provide a film that is useful for applications in which it is molded, laminated or printed on a non-flat surface such as a curved surface or an uneven surface as well as a flat surface material and that has excellent processability, moldability, solvent resistance, dimensional stability and transparency. Particularly, an object of the present invention is to provide a film having excellent isotropy of in-plane tensile strength, excellent transparency, a low degree of thickness unevenness and excellent moldability and processability, and a method for producing the film.

The present inventor(s) has/have found that a multilayer polyester film in which the maximum value of in-plane tensile strength is equal to or smaller than a given value and the difference between its maximum and minimum values is equal to or smaller than a given value shows excellent moldability and processability when molded on a non-flat surface such as an uneven surface. The present inventor(s) has/have thus achieved the present invention. Further, the present inventor(s) has/have also found that when at least two kinds of layers are laminated and the oriented structure of one of the layers is rendered unoriented by a heat treatment and the layer is subjected to heat relaxation, the in-plane distortion of a film can be removed effectively, and a film having excellent in-plane isotropy, moldability and processability can be obtained.

DISCLOSURE OF THE INVENTION

The present invention is a multilayer polyester film comprising a layer A and a layer B which are laminated alternately, the layer A constituting the outermost layer on both sides of the film, wherein:

(1) the layer A comprises a polyester A, and the layer B comprises a polyester B,
(2) the melting point of the polyester A is higher than the melting point of the polyester B by at least 15° C.,
(3) the layer A is a layer having an oriented structure, and the layer B is a layer having a substantially unoriented structure,
(4) the ratio (a/b) of the total thickness (a) of the layer A to the total thickness (b) of the layer B is 0.01 to 3, and (5) the in-plane tensile strength of the multilayer polyester film is 50 MPa or lower at a maximum, and the difference between its maximum value and minimum value is 20 MPa or smaller.

As preferred embodiments, the above invention includes the following embodiments.
a. The above film having a thickness unevenness of 10% or lower.
b. The above film having a haze value of 10% or lower.
c. The above film having three layers, composed of layers A/B/A.
d. The above film wherein the layer B is a layer whose oriented structure has been changed to a substantially unoriented structure by a heat treatment.
e. The above film wherein the polyester B comprises dicarboxylic acid units and glycol units, at least 80 mol % of the dicarboxylic acid units is a terephthalic acid unit, other dicarboxylic acid units are a naphthalene dicarboxylic acid unit and/or an isophthalic acid unit, at least 80 mol % of the glycol units is an ethylene glycol unit, and other glycol units are at least one glycol unit selected from the group consisting of a diethylene glycol unit, a 1,4-cyclohexane dimethanol unit and a neopentyl glycol unit.
f. The above film wherein the polyester B is a polyester which comprises dicarboxylic acid units comprising a terephthalic acid unit and a naphthalene dicarboxylic acid unit and glycol units comprising an ethylene glycol unit.
g. The above film wherein the polyester B is a polyester which comprises dicarboxylic acid units comprising a terephthalic acid unit and an isophthalic acid unit and glycol units comprising an ethylene glycol unit.
h. The above film wherein the polyester B is a polyester which comprises dicarboxylic acid units comprising a terephthalic acid unit and glycol units comprising an ethylene glycol unit and a 1,4-cyclohexane dimethanol unit.
i. The above film wherein the polyester B is a polyester which comprises dicarboxylic acid units comprising a terephthalic acid unit and glycol units comprising an ethylene glycol unit and a neopentyl glycol unit.
j. The above film wherein the difference between the glass transition temperature of the polyester A and the glass transition temperature of the polyester B is 50° C. or smaller in terms of absolute value.
k. A drug packaging material comprising the above film and a covering material.
l. Use of the above film for a drug packaging material.

Further, the present invention includes a method for producing a multilayer polyester film, the method comprising the steps of:
(1) obtaining an unstretched film from a polyester B and a polyester A whose melting point is higher than that of the polyester B by at least 15° C. by a coextrusion film-forming method, the unstretched film comprising a layer A and a layer B which are laminated alternately, the layer A comprising the polyester A, the layer B comprising the polyester B, the layer A constituting the outermost layer on both sides of the film, the ratio (a/b) of the total thickness (a) of the layer A to the total thickness (b) of the layer B being 0.01 to 3,
(2) stretching the unstretched film in longitudinal and transverse directions so as to obtain a stretched film, and
(3) heat-treating the stretched film.

As preferred embodiments, the above method includes the following embodiments.
a. The above method stretching the film in the longitudinal direction and the transverse direction sequentially.
b. The above method wherein the ratio ($R_{TD}/R_{MD}$) of the stretch ratio ($R_{TD}$) in the transverse direction to the stretch ratio ($R_{MD}$) in the longitudinal direction is 1 to 1.2.
c. The above method wherein the heat treatment is carried out at a temperature higher than the melting point of the polyester B and lower than the melting point of the polyester A.
d. The above method wherein the heat treatment is carried out at a temperature higher than the melting point of the polyester B by at least 5° C. and lower than the melting point of the polyester A by at least 10° C.
e. The above method wherein after the heat treatment, heat relaxation is carried out.
f. The above method wherein the relaxation rate is 1 to 10%.
g. The above method wherein after the heat relaxation, the obtained film is cooled.
h. The above method wherein the polyester B comprises dicarboxylic acid units and glycol units, at least 80 mol % of the dicarboxylic acid units is a terephthalic acid unit, other dicarboxylic acid units are a naphthalene dicarboxylic acid unit and/or an isophthalic acid unit, at least 80 mol % of the glycol units is an ethylene glycol unit, and other glycol units are at least one glycol unit selected from the group consisting of a diethylene glycol unit, a 1,4-cyclohexane dimethanol unit and a neopentyl glycol unit.
i. A multilayer polyester film obtained by the above method.

BEST MODE FOR CARRYING OUT THE INVENTION (Multilayer Polyester Film)
Hereinafter, the multilayer polyester film of the present invention will be described in detail.

(Layer Structure)
To form the multilayer polyester film of the present invention, a layer A and a layer B are laminated alternately. An example of the layer structure of the present film is a three-layer structure of A/B/A ("/" represents the structure of the layers) type wherein the layer A is the outermost layer and the layer B is an internal layer. Other examples of the layer structure of the present film include a five-layer structure of A/B/A/B/A type and multilayer structures such as 7, 9 and n+1 layer structures comprising the layers A and B laminated in the above order. Further, as required, when two or more layers A exist, one or more layers may be constituted by different polyesters. The same applies to a case where two or more layers B exist. For example, when the layer A comprises either of two types of polyesters (A1 and A2) and the layer B comprises either of two types of polyesters (B1 and B2), the present film may adopt a three-layer structure of A1/B1/A2 type or a five-layer structure of A1/B1/A2/B2/A1. Of these layer structures, the three-layer structure and the five-layer structure are preferred, and the three-layer structure is particularly preferred.

(Outermost Layer)
In the multilayer polyester film of the present invention, the layer A which has an oriented structure is the outermost layer on both sides of the film. When the layer B which has a substantially unoriented structure is the outermost layer, a portion of the film is dissolved by a solvent and is liable to set off when letters or an image is printed on the surface of the film by use of ink, indicating that the film has poor organic solvent resistance. Further, when the layer B is the outermost layer, the film is apt to stick to various rollers in a process in production of the film.

Further, either or both of the outermost surfaces of the film may be subjected to a surface treatment such as coating or a corona discharge treatment so as to improve an adhesive property, an antistatic property and mold releasability, to such an extent that the effect of the present invention is not impaired. Further, as a method of carrying out the surface treatment, a method of applying a polyester-based coating, an urethane-based coating, an acryl-based coating or a mixture thereof may be used. As for coating, a method comprising carrying out coating during a film production process or a method comprising carrying out coating in a different process after a film product such as a roll is produced can be used.

(Polyester A)

The polyester A which constitutes the layer A in the present invention is a polyester which can form an oriented structure by stretching.

The polyester A is not particularly limited but is preferably a polyester whose main dicarboxylic acid units comprise terephthalic acid and/or a 2,6-naphthalene dicarboxylic acid unit and main glycol units comprise an ethylene glycol unit.

The polyester may contain other carboxylic acid units such as isophthalic acid, orthophthalic acid, 2,7-naphthalene dicarboxylic acid, 1,5-naphthalene dicarboxylic acid, 4,4'-biphenyldicarboxylic acid, 2,2-biphenyldicarboxylic acid, succinic acid, adipic acid, azelaic acid and sebacic acid as required.

Further, the polyester may also contain other glycol units such as propylene glycol, 1,4-butanediol, 1,5-pentanediol, 1,6-hexanediol, neopentyl glycol, 1,4-cyclohexane dimethanol, a polyethylene glycol and a polytetramethylene glycol.

Specific examples of the polyester A include a polyethylene terephthalate, a polyethylene terephthalate copolymerized with a small amount of a third component, a polyethylene-2,6-naphthalate and a polyethylene-2,6-naphthalate copolymerized with a small amount of a third component.

(Polyester B)

The polyester B which constitutes the layer B is a polyester which forms an oriented structure by stretching as in the case of the above polyester A. The polyester B has a melting point which is lower than the melting point of the polyester A by at least 15° C. The polyester B is not particularly limited in its composition as long as it has the characteristic. The polyester B is preferably a copolyester whose main dicarboxylic acid units comprise terephthalic acid and/or a 2,6-naphthalene dicarboxylic acid unit. Preferred examples of other dicarboxylic acid units of the copolyester include those exemplified as other dicarboxylic acid units of the polyester A, and preferred examples of glycol units of the copolyester include those exemplified as glycol units of the polyester A.

Specific examples of the copolyester include the following copolyesters (i) to (iv), i.e., (i) a copolyester which comprises dicarboxylic acid units comprising a terephthalic acid unit and a naphthalene dicarboxylic acid unit and glycol units comprising an ethylene glycol unit, (ii) a copolyester which comprises dicarboxylic acid units comprising a terephthalic acid unit and an isophthalic acid unit and glycol units comprising an ethylene glycol unit, (iii) a copolyester which comprises dicarboxylic acid units comprising a terephthalic acid unit and glycol units comprising an ethylene glycol unit and a 1,4-cyclohexane dimethanol unit, and (iv) a copolyester which comprises dicarboxylic acid units comprising a terephthalic acid unit and glycol units comprising an ethylene glycol unit and a neopentyl glycol unit.

It is preferred that the polyester B comprise dicarboxylic acid units and glycol units, at least 80 mol % of the dicarboxylic acid units be a terephthalic acid unit, other dicarboxylic acid units be a naphthalene dicarboxylic acid unit and/or an isophthalic acid unit, at least 80 mol % of the glycol units be an ethylene glycol unit and other glycol units be at least one glycol unit selected from the group consisting of a diethylene glycol unit, a 1,4-cyclohexane dimethanol unit and a neopentyl glycol unit.

The polyester B is more preferably a copolyester comprising a terephthalic acid unit in an amount of 95 to 80 mol % and a naphthalene dicarboxylic acid unit in an amount of 5 to 20 mol % based on all dicarboxylic acid units.

(Melting Points of Polyesters)

The melting point of the polyester A in the present invention is higher than that of the polyester B by at least 15° C. The melting point of the polyester A is higher than that of the polyester B preferably by at least 25° C., more preferably by at least 35° C. The melting point of the polyester A preferably ranges from 205° C. to 270° C. The melting point of the polyester B preferably ranges from 190° C. to 250° C. The "melting point" refers to a melt endothermic peak temperature when a sample obtained by melting the polyester once and then quenching and solidifying it is heated at a rate of 20° C./min by a differential scanning calorimeter.

When a plurality of polyesters, e.g., A1, A2 and A3, are used as the polyester A and a plurality of polyesters, e.g., B1 and B2, are used as the polyester B, such a combination of the polyesters that the melting point of a polyester $A_L$ having the lowest melting point among the polyesters A is higher than the melting point of a polyester $B_H$ having the highest meting point among the polyesters B by at least 15° C. is selected.

(Glass Transition Temperature of Polyester A)

The glass transition temperature of the polyester A is preferably 30° C. or higher, more preferably 50° C. or higher, so as to obtain a film having excellent dimensional stability, thermal deformation resistance, curling resistance and anti-adhesion to a roller. The "glass transition temperature" refers to a structural change (specific heat change) temperature when a sample obtained by melting the polyester once and then quenching and solidifying it is heated at a rate of 20° C./min by a differential scanning calorimeter.

(Production Methods of Polyesters A and B)

The polyesters A and B can be produced by known methods. Specific examples of the methods include the following two methods. A first method is a method comprising reacting one or more dicarboxylic acid ester forming derivatives with one or more glycols in a reaction step during production of the polyester. A second method is a method comprising melt-mixing two or more polyesters by use of a single-screw or twin-screw extruder so as to cause the polyesters to undergo an ester exchange reaction (redistribution reaction). Further, in these steps, if necessary, particles, polyolefins and various other additives may be contained in the polyesters.

(Oriented Structure)

The multilayer polyester film of the present invention has a laminate structure comprising the layer A having an oriented structure and the layer B having a substantially unoriented structure.

The oriented structure of the layer A is preferably formed by biaxial stretching. The unoriented structure of the layer B is preferably formed by making an oriented structure formed by biaxial stretching substantially unoriented by a heat treatment.

The heat treatment which gives an unoriented structure to the layer B can be carried out at a temperature lower than the melting point of the polyester A and higher than the melting point of the polyester B, with the layer A laminated on both surfaces of the layer B. Thereby, the polyester B becomes molten once, and the oriented structure of the layer B changes from the oriented structure formed by biaxial stretching into a substantially unoriented structure.

This heat treatment can be carried out with good productivity by setting the temperature of a heat setting temperature of the layer A after stretching at a temperature lower than the melting point of the polyester A and higher than the melting point of the polyester B.

(Total Thickness of Layer A and Total Thickness of Layer B)

In the multilayer polyester film of the present invention, the ratio (a/b) of the total thickness (a) of the layer A to the total thickness (b) of the layer B is 0.01 to 3, preferably 0.03 to 2, more preferably 0.05 to 1. For example, when the layer structure comprises three layers, i.e., A1 (thickness: a1)/B (thickness: b)/A2 (thickness: a2), the total thickness ratio (a/b), i.e., (a1+a2)/(b) is 0.01 to 3. Further, when the layer structure comprises five layers, i.e., A1 (thickness: a1)/B1 (thickness: b1)/A2 (thickness: a2)/B2 (thickness: b2)/A3 (thickness: a3), the total thickness ratio (a/b), i.e., (a1+a2+a3)/(b1+b2) is 0.01 to 3.

When the total thickness ratio (a/b) is less than 0.01, the thickness of the outermost layer A is so small that control of the thickness in production of the film is difficult and a portion of the layer B is liable to be exposed to the surface layer. Further, a film having unsatisfactory dimensional stability is obtained. Meanwhile, when the total thickness ratio is more than 3, the proportion of the layer B having a substantially amorphous structure inside the layer structure is so low that the processability and flexibility of the film become unsatisfactory. Accordingly, when the film is subjected to deformation processing such as molding or embossing, problems occur. Further, it becomes difficult to use the film with the film held and fixed by holding metallic parts.

(Total Thickness of Multilayer Polyester Film)

The total thickness of the multilayer polyester film of the present invention is preferably 10 to 3,000 μm, more preferably 50 to 2,000 μm, particularly preferably 100 to 1,000 μm. The total thickness of the multilayer polyester film is the total (a+b) of the total thickness (a) of the layer A and the total thickness (b) of the layer B.

When the multilayer polyester film of the present invention is used as a product, it may be used alone or two or more of the films may be laminated and used. In the case of this lamination, the thickness of the resulting laminate is determined as appropriate according to the number of films to be laminated, the total thickness of each film and reasons for using the film. The thickness of the whole laminate is preferably 100 to 5,000 μm, more preferably 200 to 2,000 μm.

(Tensile Strength)

The maximum value of the in-plane tensile strength of the multilayer polyester film of the present invention is 50 MPa or smaller, preferably 40 MPa or smaller. Further, the difference between the maximum value and minimum value of the tensile strength is 20 MPa or smaller, preferably 15 MPa or smaller. When the maximum value of the tensile strength is larger than 50 MPa, the rigidity of the film is so high that unsuccessful molding results. Further, when the difference between the maximum value and minimum value of the tensile strength is larger than 20 MPa, balance in the in-plane moldability of the film deteriorates, and uniform molding conforming to a mold becomes difficult.

Such a film in which the difference between the maximum value and minimum value of in-plane tensile strength is equal to or smaller than a given value can be suitably produced by setting the ratio ($R_{TD}/R_{MD}$) of the stretch ratio ($R_{TD}$) in a transverse direction to the stretch ratio ($R_{MD}$) in a longitudinal direction at a value close to 1 and carrying out heat relaxation after a heat treatment. It is preferred to carry out stretching in the longitudinal and transverse directions at an $R_{TD}/R_{MD}$ of 1 to 1.2.

(Thickness Unevenness)

Thickness unevenness is calculated by the following expression.

Thickness Unevenness (%)={(Maximum Thickness−Minimum Thickness)/Average Thickness}×100

The thickness unevenness is 10% or lower, preferably 8% or lower.

A film with little thickness unevenness can be produced by carrying out biaxial stretching and then carrying out a heat treatment at a temperature lower than the melting point of the polyester A by at least 10° C. To further reduce the thickness unevenness, the difference between the glass transition temperature of the polyester A and the glass transition temperature of the polyester B is preferably 50° C. or smaller in terms of absolute value. The difference in temperature is more preferably 30° C. or smaller, much more preferably 20° C. or smaller. When the difference between the glass transition temperatures of the two polymers is small, it can be prevented from occurring that loads the layers are subjected to at the time of stretching are significantly varied, whereby the thickness unevenness can be further reduced.

(Haze Value)

The multilayer polyester film of the present invention preferably has a haze value of 10% or lower, more preferably 8% or lower, in view of transparency. When the haze value is higher than 10%, there occurs such a problem that letters or images are difficult to see through the film when the letters or images are printed on the film.

To obtain such a haze value, firstly, polymers with high transparency must be selected. An example of the highly transparent polymers is a copolyester with a low degree of crystallinity. Specific examples of the copolyester are the same as those described above.

Secondly, film forming conditions must be appropriate. That is, the film of the present invention whose oriented structure formed by stretching must be transformed into an amorphous structure by a heat treatment after the stretching and must be cooled as quickly as possible after the heat treatment. Unless the film is cooled quickly, the amorphous structure crystallizes, resulting in a very cloudy, white film.

A specific example of a method for cooling the film is a method comprising contacting the film with a cooled metallic roll after the heat treatment.

Thirdly, when inert particles as a filler are added so as to impart slipperiness to the film, the average particle diameter thereof must be 0.01 to 3 μm, and the amount thereof based on the whole film must be as high as 0.05 wt %. When the average particle diameter is smaller than 0.01 μm, slipperiness is not given to the film disadvantageously, while when the average particle diameter is larger than 3 μm, the haze value of the present invention is not obtained, and the inert particles may come off from the film disadvantageously. Further, it is not preferable that the particles be added in an amount of larger than 0.05 wt %. As for the kind of the inert fine particles, particles which are not extremely flat or particles which hardly form voids at the interface between the resin and the particles are desirably selected so that slipperiness is obtained by addition in a small amount. Although not particularly limited, porous silica particles having an average particle diameter of 1 to 3 μm which are aggregates of primary particles having an average particle diameter of 0.01 to 0.1 μm are preferably added in an amount of 0.001 to 0.1 wt %, for example. Further, in necessary, slipperiness may be given by a surface coating layer without addition of the inert particles.

(Additives)

The layer A and/or the layer B in the present invention may further contain various additives to such an extent that the object of the present invention is not impaired.

For example, the layers may contain such components as an elastomer resin, e.g., a polybutylene terephthalate-polytetramethylene glycol block copolymer, a pigment, a dye, a heat stabilizer, a flame retardant, a foaming agent and an ultraviolet absorber.

(Production Method of Multilayer Polyester Film)

The production method of the multilayer polyester film comprises the steps of film formation by coextrusion, stretching and a heat treatment. The present invention includes a multilayer polyester film obtained by the method.

(Film Formation by Coextrusion)

This is a step of obtaining an unstretched film from a polyester A and a polyester B by a coextrusion film-forming method, the unstretched film comprising a layer A and a layer B which are laminated alternately, the layer A comprising the polyester A, the layer B comprising the polyester B, the layer A constituting the outermost layer on both sides of the film, the ratio (a/b) of the total thickness (a) of the layer A to the total thickness (b) of the layer B being 0.01 to 3.

More specifically, chips of the polyester A are dried and molten. At the same time, chips of the polyester B are dried and molten. Then, these molten polyesters are laminated in a die. For example, they are laminated in a die in which a feed block is disposed. In that case, spaces in the feed block are adjusted such that the ratio (a/b) of the total thickness (a) of the layer A to the total thickness (b) of the layer B ranges from 0.01 to 3. Thereafter, the resulting laminate is cast on a cooling drum so as to obtain an unstretched film.

The melting point of the polyester A must be higher than that of the polyester B by at least 15° C. The melting point of the polyester A is preferably higher than that of the polyester B by at least 25° C., more preferably by at least 35° C. in particular. When the difference in melting point between the polyesters A and B is small, optimization of a temperature at which the heat treatment is carried out is difficult to achieve. That is, when the heat treatment temperature is too close to the melting point of the polyester B, the polyester B is not fully molten, resulting in unsatisfactory transformation into a substantially unoriented structure. Meanwhile, when the heat treatment temperature is too close to the melting point of the polyester A, the polyester A starts to melt partially, so that such problems as the occurrence of being broken of the film and fusion in the rolled-up film are liable to occur during production of the film.

(Stretching)

This is a step of stretching the unstretched film in longitudinal and transverse directions so as to obtain a stretched film. The unstretched film may be stretched in the longitudinal direction first and then in the transverse direction or may be stretched in the two directions simultaneously.

The film is stretched to at least 2.5 times, preferably to 3 to 6 times, in the longitudinal direction at temperatures (Tc) ranging from the Tg (glass transition temperature) of the polyester A−10° C. to the Tg+50° C.

The film is stretched to at least 2.5 times, preferably to 3 to 6 times, in the transverse direction at temperatures (Tc) ranging from the Tg of the polyester A+10° C. to the Tg+50° C.

This stretching is preferably at least 8 times, more preferably at least 9 times, in terms of area ratio.

The ratio of the stretch ratio ($R_{TD}$) in the transverse direction to the stretch ratio ($R_{MD}$) in the longitudinal direction, i.e., $R_{TD}/R_{MD}$, preferably ranges from 1 to 1.2, more preferably ranges from 1 to 1.1.

Thus, in the present invention, stretching is performed with the stretch ratio in the transverse direction equal to or slightly larger than the stretch ratio in the longitudinal direction so as to impart an oriented structure to the layer A and the layer B. Then, only the oriented structure of the layer B is transformed into a substantially unoriented structure by the heat treatment. Thereafter, heat relaxation in the transverse direction is carried out so as to relax the stretch ratio in the transverse direction in which the film is stretched slightly harder than in the longitudinal direction, thereby making the degree of orientation in the longitudinal and transverse directions uniform. This method has such an advantage that distortions occurred in the layers A by stretching are eliminated easily at the time of the heat relaxation since the layer B which exists between the layers A has a substantially unoriented structure.

(Heat Treatment)

This is a step of heat-treating the stretched film, transforming the oriented structure of the layer B into a substantially unoriented structure and heat-setting the layer A. The heat treatment time is 10 to 180 seconds, preferably 20 to 120 seconds. The heat treatment is generally carried out with both sides of the film held by clips of a stenter right after stretching of the film to the transverse direction.

By this heat treatment, the polyester B is molten, and the oriented structure formed by biaxial stretching in the longitudinal and transverse directions is changed into the substantially unoriented structure. It is vital that the heat treatment temperature be higher than the melting point of the polyester B. The heat treatment temperature is preferably a temperature higher than the melting point of the layer B by at least 5° C. and lower than the melting point of the layer A by at least 10° C. By this heat treatment, the layer A is given the effect of heat setting treatment.

(Heat Relaxation)

The film is preferably subjected to heat relaxation in the transverse direction after the heat treatment. This heat relaxation is sometimes referred to as so-called "toe-in". To carry out the heat relaxation, both sides of the film are held by clips of a stenter, and the film is heat-relaxed in the transverse direction under heating. The heat relaxation is preferably carried out after the heat treatment. When the heat relaxation is carried out after the heat treatment, the film is heat-relaxed in the presence of the layer B having a substantially unoriented structure, so that distortions caused by stretching are easily eliminated advantageously, as described above.

The relaxation rate is 1 to 10%, preferably 2 to 8%. By heat-relaxing the stretched, heat-treated film, a multilayer polyester film in which the difference between the maximum and minimum values of the in-plane tensile strength of the film is equal to or smaller than a given value can be obtained.

(Cooling)

The obtained film is preferably cooled as quickly as possible so as to prevent crystallization of the amorphous oriented structure.

(Uses)

The multilayer polyester film of the present invention is a film which is excellent in processability, moldability, solvent resistance, dimensional stability and transparency. Therefore, the multilayer polyester film of the present invention is suitable for use in fields of food packages, drug packages, laminate molding, IC card materials, magnetic recording card materials and agriculture. In particular, of these applications, the present film is suitable for use in applications in which it is molded, laminated or printed on a non-flat surface such as a curved surface or an uneven surface as well as a flat surface material. The multilayer polyester film of the present invention can be preferably used in the following fields (i) to (iv), for example.

(i) the field of food packages having a three-dimensional structure such as trays and ice cream cups.
(ii) the field of PTP (Push Through Package) drug packages for capsules and tablets.
(iii) the field of film products for use in furniture, electrical appliances and automobile parts, for example, a laminated film comprising a film and wood, metal, a resin or rubber. The field in which the film is molded into a three-dimensional structure by bending, surface curving, roughening, blow molding or the like.
(iv) the field of print foils for printing on a non-flat three-dimensional surface such as a curved surface or uneven surface which are used in furniture, electrical appliances and automobile parts.
(v) the field of materials for magnetic recording cards and IC recording cards such as ATM cards, ID cards and credit cards in which films embossed with letters and patterns, magnetic tapes and IC chips are embedded.
(vi) the field of agriculture such as a green house in which the film is fixed by a frame and clips and used.

Particularly, the present invention includes a drug packaging material comprising the multilayer polyester film of the present invention and a covering material.

An example of the drug packaging material is a PTP packaging material. The PTP packaging material has such a structure that tablets or foods are contained in the pits of a plastic sheet having a number of pits and the whole surface is covered with a covering material such as aluminum foil. The plastic sheet having the pits is called a blister bottom material. The multilayer polyester film of the present invention is suitably used as the blister bottom material.

As the covering material, aluminum foil having a thickness of about 10 to 50 μm is generally used. The covering material is used in a PTP packaging step after a print layer or an adhesive layer is formed thereon. The aluminum foil has advantages that it has a barrier property and is printable and that the covering material is easily broken by contents at the press of the blister bottom side and the content can be taken out of the sheet.

Further, the present invention includes use of the multilayer polyester film for a drug packaging material.

EXAMPLES

Hereinafter, the present invention will be more specifically described with reference to Examples and Comparative Examples. Methods of measuring and evaluating properties used in Examples and Comparative Examples are as follows.

(1) Moldability

A film is press-molded at 130° C. in a PTP molding machine having a heating plug so as to prepare a film for packing on which pockets each having a length of 20 mm, a width of 20 mm and a depth of 10 mm were formed at intervals of 10 mm. The obtained film for packing is evaluated based on the following criteria.

o: The shape of the molded film is not distorted and conforms to a mold, and no wrinkles are found in the film.
Δ: The shape of the molded film is distorted or wrinkles are found in the film.
x: The shape of the molded film does not conform to a mold, and wrinkles or ruptures are found in the film.

(2) Melting Point

A sample (10 mg) is heated at a temperature increasing rate of 20° C./min by use of a differential scanning calorimeter DSC (product of Du Pont Co., Ltd., V4.OB2000), and a temperature corresponding to the highest endothermic peak along with melting is defined as a melting point.

(3) Haze Value

A haze value (%) is measured by a haze meter (product of Japan Precision Engineering Co., Ltd., POIC haze meter SEP-HS-D1).

(4) Tensile Strength

By use of a tensile tester (product of Toyo Baldwin Co., Ltd., trade name "TENSILON") as a measuring device, samples having a length in the longitudinal direction of 150 mm and a length in the transverse direction of 10 mm are sampled from the longitudinal direction, 15° direction, 30° direction, 45° direction, 60° direction, 75° direction, transverse direction, 105° direction, 120° direction, 135° direction, 150° direction and 165° direction of the obtained polyester film. The samples are held and fixed by chucks set at intervals of 100 mm in an atmosphere of 80° C., and loads are measured by a load cell attached to the tensile tester at a rate of 100 mm/min. Then, loads when rupture occurs are read and divided by the cross sectional areas of the samples before pulling so as to determine tensile strength at break (MPa).

(5) Thickness Unevenness

A sample having a width of 3 cm and a length of 5 m is measured continuously by use of a micrometer, and thickness unevenness is calculated by the following expression.

Thickness Unevenness (%)={(Maximum Thickness−Minimum Thickness)/Average Thickness)}100

Example 1

(Coextrusion)

The polyester components shown in Table 1 were blended in the blend ratios shown in Table 1, dried, and molten by a single-screw extruder.

As for symbols representing components shown in Tables 1 and 2, PTA represents terephthalic acid, NDC represents 2,6-naphthalene dicarboxylic acid, IA represents isophthalic acid, EG represents ethylene glycol, DEG represents diethylene glycol, and CHDM represents 1,4-cyclohexane dimethanol.

Thereafter, in a die, the molten polymers were laminated into a three-layer structure of layer A/layer B/layer A. The resulting laminate was cast on a cooling drum so as to obtain an unstretched film.

(Stretching)

Then, the unstretched film was biaxially stretched in longitudinal and transverse directions sequentially under the stretch conditions shown in Table 1 so as to obtain a stretched film.

(Heat Treatment)

Thereafter, the stretched film was heat-treated at the temperature shown in Table 1.

(Heat Relaxation)

The heat-treated film was subjected to heat relaxation (toe-in) at the relaxation rate shown in Table 1, thereby obtaining a three-layer film.

The obtained three-layer film had such a thickness constitution that the outermost layers (layers A) comprising PET on both sides of the film each had a thickness of 5 μm and the core layer (layer B) had a thickness of 90 μm, indicating that the total thickness of the film was 100 μm. The properties of the obtained three-layer film were measured. The results of the measurements are shown in Table 1. The obtained three-layer film was satisfactory with respect to the maximum value, the difference between the maximum value and minimum value of tensile strength, haze and thickness unevenness.

The obtained three-layer film was molded by use of a PTP molding machine, and its moldability was evaluated. The film also showed good moldability.

Examples 2 to 4 and Comparative Examples 1 to 3

Polyesters having compositions shown in Tables 1 and 2 were used, and three-layer films were obtained in the same manner as in Example 1. The properties of the obtained three-layer films were evaluated in the same manner as in Example 1. The results of the evaluations are shown in Tables 1 and 2. As is obvious from Tables 1 and 2, all Examples which satisfied the conditions of the present invention showed good results.

On the other hand, Comparative Example 1 showed poor isotropy of in-plane tensile strength, and the molded sample showed a distorted shape and a high degree of thickness unevenness. In Comparative Example 2, the resulting multilayer film showed a high degree of thickness unevenness due to the improper longitudinal stretching temperature and therefore was not a good film. Further, the maximum value of tensile strength was high, resulting in unsuccessful molding. As for Comparative Example 3, because its heat setting temperature was equal to the melting point of the layer B, the layer B was not fully molten, transformation into a substantially unoriented structure was unsatisfactory, and moldability was poor.

TABLE 1

| | | | | Ex. 1 | Ex. 2 | Ex. 3 | Ex. 4 |
|---|---|---|---|---|---|---|---|
| Layer A | Constituents | Carboxylic Acid Units | PTA | 100 | 0 | 95 | 100 |
| | | (mol %) | NDC | 0 | 100 | 5 | 0 |
| | | | IA | 0 | 0 | 0 | 0 |
| | | Glycol Units | EG | 98 | 99 | 98 | 98 |
| | | (mol %) | DEG | 2 | 1 | 1 | 2 |
| | | | CHDM | 0 | 0 | 1 | 0 |
| | Melting Point (° C.) | | | 255 | 268 | 255 | 255 |
| | Added Particles | Kind | | Aggregated Silica | | | |
| | | Average Particle Diameter (μm) | | 1.5 | | | |
| | | Added Amount (wt %) | | 0.05 | | | |
| Layer B | Constituents | Carboxylic Acid Units | PTA | 85 | 90 | 100 | 85 |
| | | (mol %) | NDC | 5 | 10 | 0 | 0 |
| | | | IA | 10 | 0 | 0 | 15 |
| | | Glycol Units | EG | 98 | 98 | 84 | 98 |
| | | (mol %) | DEG | 2 | 2 | 1 | 2 |
| | | | CHDM | 0 | 0 | 15 | 0 |
| | Melting Point (° C.) | | | 217 | 229 | 220 | 217 |
| | Added Particles | Kind | | None | | | |
| | | Average Particle Diameter (μm) | | | | | |
| | | Added Amount (wt %) | | | | | |
| Stretching | Longitudinal Direction | Temperature (° C.) | | 120 | 150 | 110 | 120 |
| | | Ratio | | 3.0 | 3.0 | 3.2 | 3.0 |
| | Transverse Direction | Temperature (° C.) | | 120 | 150 | 120 | 120 |
| | | Ratio | | 3.1 | 3.2 | 3.4 | 3.0 |
| Heat Treatment Temperature (° C.) | | | | 235 | 245 | 230 | 235 |
| Heat Relaxation Rate (%) | | | | 5 | 5 | 5 | 5 |
| Tensile Strength (MPa) | | Maximum Value | | 30 | 50 | 30 | 25 |
| | | Minimum Value | | 25 | 40 | 20 | 20 |
| | | Maximum Value − Minimum Value | | 5 | 10 | 10 | 5 |
| Haze (%) | | | | 5 | 7 | 7 | 5 |
| Thickness Unevenness (%) | | | | 7 | 7 | 8 | 8 |
| Moldability | | | | ◯ | ◯ | ◯ | ◯ |

Ex.: Example

TABLE 2

|  |  |  |  | C. Ex. 1 | C. Ex. 2 | C. Ex. 3 |
|---|---|---|---|---|---|---|
| Layer A | Constituents | Carboxylic Acid Units (mol %) | PTA | 100 | 0 | 100 |
|  |  |  | NDC | 0 | 100 | 0 |
|  |  |  | IA | 0 | 0 | 0 |
|  |  | Glycol Units (mol %) | EG | 98 | 99 | 98 |
|  |  |  | DEG | 2 | 1 | 2 |
|  |  |  | CHDM | 0 | 0 | 0 |
|  | Melting Point (° C.) |  |  | 255 | 268 | 255 |
|  | Added Particles | Kind |  | Aggregated Silica | | |
|  |  | Average Particle Diameter (μm) |  | 1.5 | | |
|  |  | Added Amount (wt %) |  | 0.05 | | |
| Layer B | Constituents | Carboxylic Acid Units (mol %) | PTA | 85 | 90 | 85 |
|  |  |  | NDC | 5 | 10 | 15 |
|  |  |  | IA | 10 | 0 | 0 |
|  |  | Glycol Units (mol %) | EG | 98 | 98 | 99 |
|  |  |  | DEG | 2 | 2 | 1 |
|  |  |  | CHDM | 0 | 0 | 0 |
|  | Melting Point (° C.) |  |  | 217 | 229 | 220 |
|  | Added Particles | Kind |  |  | None |  |
|  |  | Average Particle Diameter (μm) |  |  |  |  |
|  |  | Added Amount (wt %) |  |  |  |  |
| Stretching | Longitudinal Direction | Temperature (° C.) |  | 110 | 110 | 110 |
|  |  | Ratio |  | 3.2 | 3.2 | 3.0 |
|  | Transverse Direction | Temperature (° C.) |  | 120 | 120 | 120 |
|  |  | Ratio |  | 3.4 | 3.2 | 3.0 |
| Heat Treatment Temperature (° C.) |  |  |  | 230 | 245 | 220 |
| Heat Relaxation Rate (%) |  |  |  | 0 | 0 | 0 |
| Tensile Strength (MPa) | Maximum Value |  |  | 50 | 100 | 150 |
|  | Minimum Value |  |  | 25 | 80 | 145 |
|  | Maximum Value – Minimum Value |  |  | 25 | 20 | 5 |
| Haze (%) |  |  |  | 7 | 5 | 5 |
| Thickness Unevenness (%) |  |  |  | 8 | 10% or More | 5 |
| Moldability |  |  |  | Δ | X | X |

C. Ex.: Example (Effects of the Invention)

According to the present invention, there are provided a film having excellent isotropy of in-plane tensile strength, excellent transparency, a low degree of thickness unevenness and excellent moldability and processability, and a method for producing the film.

Further, according to the present invention, a multilayer polyester film having excellent solvent resistance and dimensional stability is provided at low cost.

POSSIBILITY OF INDUSTRIAL UTILIZATION

The film of the present invention is particularly useful in fields of food packages, drug packages, laminate molding, IC card materials, magnetic recording card materials and agriculture.

The invention claimed is:

1. A multilayer polyester film comprising a layer A and a layer B which are laminated alternately, the layer A constituting the outermost layer on both sides of the film, wherein (1) the layer A comprises a polyester A, and the layer B comprises a polyester B, (2) the melting point of the polyester A is higher than the melting point of the polyester B by at least 15° C., (3) the layer A is a layer having an oriented structure, and the layer B is a layer having a substantially unoriented structure, (4) the ratio (a/b) of the total thickness (a) of the layer A to the total thickness (b) of the layerBis 0.01 to 3, and (5) the in-plane tensile strength of the multilayer polyester film is 50 MPa or lower at a maximum, and the difference between its maximum value and minimum value is 20 MPa or smaller, said multilayer polyester film having a thickness unevenness of 10% or lower and a haze value of 10% or lower.

2. The film of claim 1, having three layers, composed of layers A/B/A, wherein layer A and layer B are as defined in claim 1.

3. The film of claim 1, wherein the layer B is a layer whose oriented structure has been changed to a substantially unoriented structure by a heat treatment.

4. The film of claim 1, wherein the polyester B comprises dicarboxylic acid units and glycol units, at least 80 mol % of the dicarboxylic acid units is a terephthalic acid unit, other dicarboxylic acid units are a naphthalene dicarboxylic acid unit and/or an isophthalic acid unit, at least 80 mol % of the glycol units is an ethylene glycol unit, and other glycol units are at least one glycol unit selected from the group consisting of a diethylene glycol unit, a 1,4-cyclohexane dimethanol unit and a neopentyl glycol unit.

5. The film of claim 1, wherein the polyester B is a polyester which comprises dicarboxylic acid units comprising a terephthalic acid unit and a naphthalene dicarboxylic acid unit and glycol units comprising an ethylene glycol unit.

6. The film of claim 1, wherein the polyester B is a polyester which comprises dicarboxylic acid units comprising a terephthalic acid unit and an isophthalic acid unit and glycol units comprising an ethylene glycol unit.

7. The film of claim 1, wherein the polyester B is a polyester which comprises dicarboxylic acid units comprising a terephthalic acid unit and glycol units comprising an ethylene glycol unit and a 1,4-cyclohexane dimethanol unit.

8. The film of claim 1, wherein the polyester B is a polyester which comprises dicarboxylic acid units comprising a terephthalic acid unit and glycol units comprising an ethylene glycol unit and a neopentyl glycol unit.

9. The film of claim 1, wherein the difference between the glass transition temperature of the polyester A and the glass transition temperature of the polyester B is 50° C. or smaller in terms of absolute value.

10. A method for producing a multilayer polyester film as claimed in claim 1, comprising the steps of:
(1) obtaining an unstretched film from a polyester B and a polyester A whose melting point is higher than that of the polyester B by at least 15° C. by a coextrusion film-forming method, the unstretched film comprising a layer A and a layer B which are laminated alternately, the layer A comprising the polyester A, the layer B comprising the polyester B, the layer A constituting the outermost layer on both sides of the film, the ratio (a/b) of the total thickness (a) of the layer A to the total thickness (b) of the layer B being 0.01 to 3,
(2) stretching the unstretched film in longitudinal and transverse directions so as to obtain a stretched film, and
(3) heat-treating the stretched film.

11. The method of claim 10, which comprises stretching the film in the longitudinal direction and in the transverse direction in that order.

12. The method of claim 10, wherein the ratio ($R_{TD}/R_{MD}$) of the stretch ratio ($R_{TD}$) in the transverse direction to the stretch ratio ($R_{MD}$) in the longitudinal direction is 1 to 1.2.

13. The method of claim 10, wherein the heat treatment is carried out at a temperature higher than the melting point of the polyester B and lower than the melting point of the polyester A.

14. The method of claim 10, wherein the heat treatment is carried out at a temperature higher than the melting point of the polyester B by at least 5° C. and lower than the melting point of the polyester A by at least 10° C.

15. The method of claim 10, wherein after the heat treatment, heat relaxation is carried out.

16. The method of claim 15, wherein the relaxation rate is ito 10%.

17. The method of claim 15, wherein after the heat relaxation, the obtained film is cooled.

18. The method of claim 10, wherein the polyester B comprises dicarboxylic acid units and glycol units, at least 80 mol % of the dicarboxylic acid units is a terephthalic acid unit, other dicarboxylic acid units are a naphthalene dicarboxylic acid unit and/or an isophthalic acid unit, at least 80 mol % of the glycol units is an ethylene glycol unit, and other glycol units are at least one glycol unit selected from the group consisting of a diethylene glycol unit, a 1,4-cyclohexane dimethanol unit and a neopentyl glycol unit.

19. A multilayer polyester film as claimed in claim 1 obtained by a method comprising the steps of:
(1) obtaining an unstretched film from a polyester B and a polyester A whose melting point is higher than that of the polyester B by at least 15° C. by a coextrusion film-forming method, the unstretched film comprising a layer A and a layer B which are laminated alternately, the layer A comprising the polyester A, the layer B comprising the polyester B, the layer A constituting the outermost layer on both sides of the film, the ratio (a/b) of the total thickness (a) of the layer A to the total thickness (b) of the layer B being 0.01 to 3,
(2) stretching the unstretched film in longitudinal and transverse directions so as to obtain a stretched film, and
(3) heat-treating the stretched film.

20. A drug packaging material comprising the film of claim 1 and a covering material.

* * * * *